Figure 1:
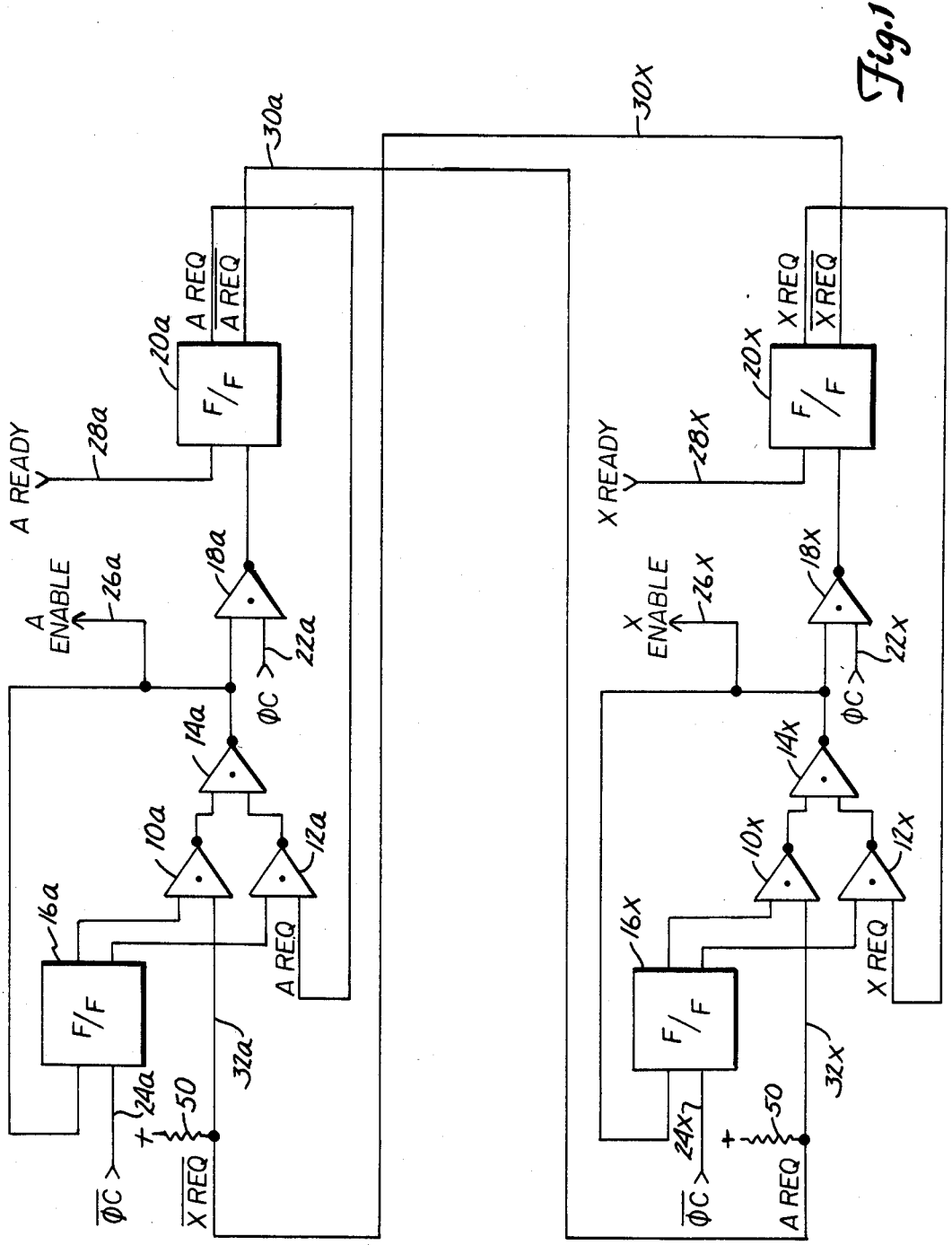

United States Patent [19]

Van Hatten et al.

[11] Patent Number: 4,594,590
[45] Date of Patent: Jun. 10, 1986

[54] DEMAND DRIVEN ACCESS MECHANISM

[75] Inventors: David A. Van Hatten; Herman T. Nielsen, both of New Brighton, Minn.

[73] Assignee: Control Data Corporation, Minneapolis, Minn.

[21] Appl. No.: 548,791

[22] Filed: Nov. 4, 1983

[51] Int. Cl.[4] .............................................. H04Q 1/00
[52] U.S. Cl. ............................ 340/825.51; 340/825.51
[58] Field of Search ........................ 340/825.5, 825.51; 370/91, 85

[56] References Cited

U.S. PATENT DOCUMENTS

| | | | |
|---|---|---|---|
| 3,876,868 | 4/1975 | Cramwinckel et al. | 340/825.5 X |
| 4,227,179 | 10/1980 | Perry | 340/825.51 |
| 4,320,502 | 3/1982 | deVeer | 370/85 |
| 4,339,808 | 7/1982 | North | 340/825.5 X |
| 4,359,731 | 11/1982 | Beauford et al. | 340/825.51 |
| 4,366,480 | 12/1982 | Van Hatten | 340/825.51 |
| 4,423,384 | 12/1983 | DeBock | 340/825.51 X |

Primary Examiner—Ulysses Weldon
Attorney, Agent, or Firm—Robert M. Angus; Joseph A. Genovese

[57] ABSTRACT

A demand driven access mechanism comprises logic apparatus at each station capable of seizing use of the shared communication channel for enabling access by a selected single station. The logic apparatus receives status signals from all stations so that if one station seeks access to the channel it will be enabled. If two or more stations simultaneously seek access to the channel, the logic apparatus establishes a priority order between them, thereby enabling access to only one station at a time. The stations time-share the channel so that relatively slow stations may make more effective use of the relatively fast communication channel.

9 Claims, 3 Drawing Figures

DEMAND DRIVEN ACCESS MECHANISM

This invention relates to demand driven access mechanisms for ordering priority between several contending units seeking use of a communication channel. In particular, the invention represents an improvement of the apparatus described in U.S. Pat. No. 4,366,480.

As used herein, the term "communication channel" refers to a data bus for providing shared communication among a plurality of stations. Typically, the stations comprise components of a data processing system, such as processors, device controllers, etc.

Shared communications is ordinarily accomplished by either of two basic techniques: time division and contention. Time division systems contemplate the assigning of specific time slots to each station during which the communication channel is dedicated to that station. Contention systems contemplate permitting a station to transmit onto the channel whenever it has a message to be sent. Refinements to the contention systems include techniques such as channel active lock-out and priority ordering whereby when one station seizes use of the channel, it may lock-out all other stations, and where two or more stations are seeking simultaneous use of a channel, priority is allocated amongst the stations in a predetermined fashion. For a more complete background on time division systems and contention systems, reference may be had to the above-mentioned U.S. Pat. No. 4,366,480, granted Dec. 28, 1982 to D. A. VanHatten, entitled "Demand Driven Access Mechanism", as well as to U.S. Pat. No. 4,232,294, granted Nov. 4, 1980 to R. G. Burke and R. F. Martin for "Method and Apparatus for Rotating Priorities Between Stations Sharing granted a Communication Channel", and U.S. Pat. No. 4,199,661, Apr. 22, 1980 to P. E. White and E. G. Blumke for "Method and Apparatus for Eliminating Conflicts on a Communication Channel", all of which are assigned to the same assignee as the present invention.

As described in the above-identified VanHatten patent, one problem common to time division and contention systems resides in the fact that a delay is required before a given station can seize use of the channel without interference from other stations. In time division systems, these delays occur by virtue of allocating time slots to stations not ready to seize use of the channel. In contention systems, the delays are inherent to assure ordered priority of the contending stations. The VanHatten patent describes a demand-driven access mechanism to overcome the delay problems associated with both time division and contention systems. In particular, the VanHatten system contemplates a demand driven access mechanism for a plurality of active stations capable of seizing use of the channel in which any station may immediately seize use of the channel upon a channel inactive status, much in the manner of a contention system. However, if two or more stations attempt to seize use of the channel at a given moment, the priority order is established as between the stations seeking use of the channel to allocate use to the higher ordered station. In particular, the VanHatten apparatus employs a first logic circuit for generating a station request signal indicative that the station is ready to transmit onto the communication channel. The station request signal (or its complimentary station not-request signal) is forwarded to a second logic circuit to generate either an enable or a not-enable signal permitting or not permitting the station to seize use of the channel. Enable or not-enable signals are forwarded to similar second logic circuits in the other stations to permit or not permit those stations to generate enable signals. One of problems, however, with the apparatus described in the aforementioned VanHatten patent, resides in the fact that the station request signal must be stable prior to the next clock pulse, upon which the second logic circuitry operates. The present invention is concerned with an improvement of the apparatus described in the aforementioned VanHatten patent wherein the station request signal does not need to be stable prior to the appearance of the next clock pulse. Hence, the apparatus of the present invention operates more quickly in response to station ready signals to enable the station to seize use of the channel and to lock-out other stations from seizing use of the channel. Thus, the likelihood that two or more stations might simultaneously seize use of the channel is even further reduced.

In a communication network employing data processing equipment, it is not unusual that certain equipment, such as peripheral equipment, is of lower bandwidth than that of the channel and is not capable of processing information at the higher communications speeds of the channel. For example, it is not unusual that display terminals and the like operates at speeds of one-half, one-third or even one-tenth the speed of the communication channel. Where a terminal transmits at one-third the channel speed, only one out of each three clock cycles on the channel will contain useful information.

The present invention permits more optimum use of the channel by causing the units seeking use of the channel to time-share the channel.

It is an object of the present invention to provide a demand driven access mechanism which provides access to stations without requiring that the station request signal be stable prior to a clock signal.

Another object of the present invention is to provide a demand driven access mechanism wherein use of the channel is time-shared between all stations seeking use of the channel.

Figure 2:
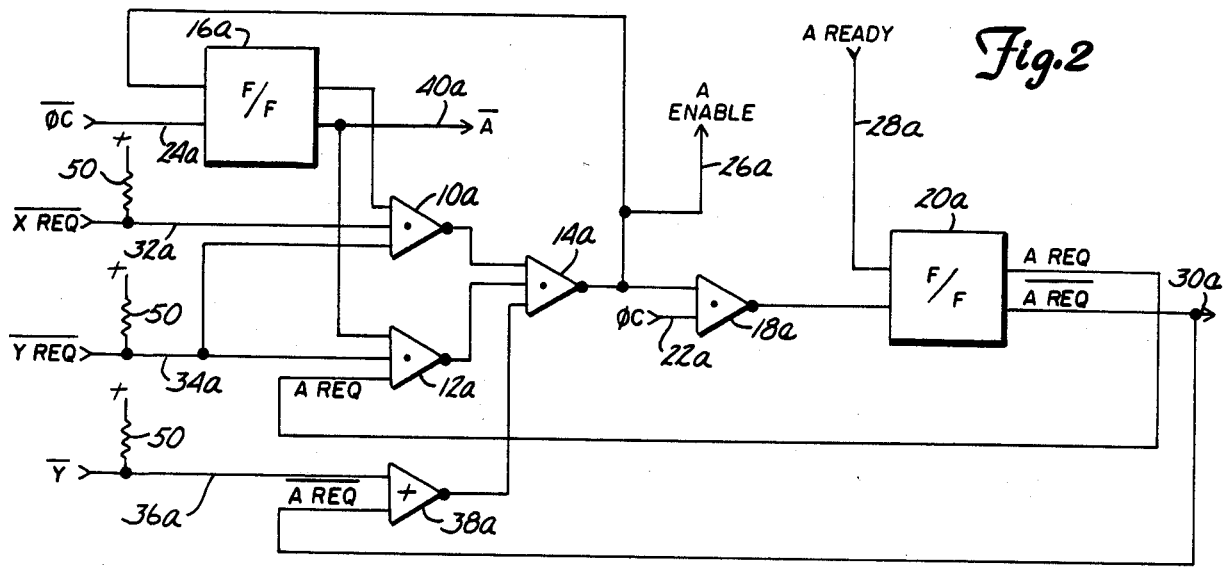
Figure 3:
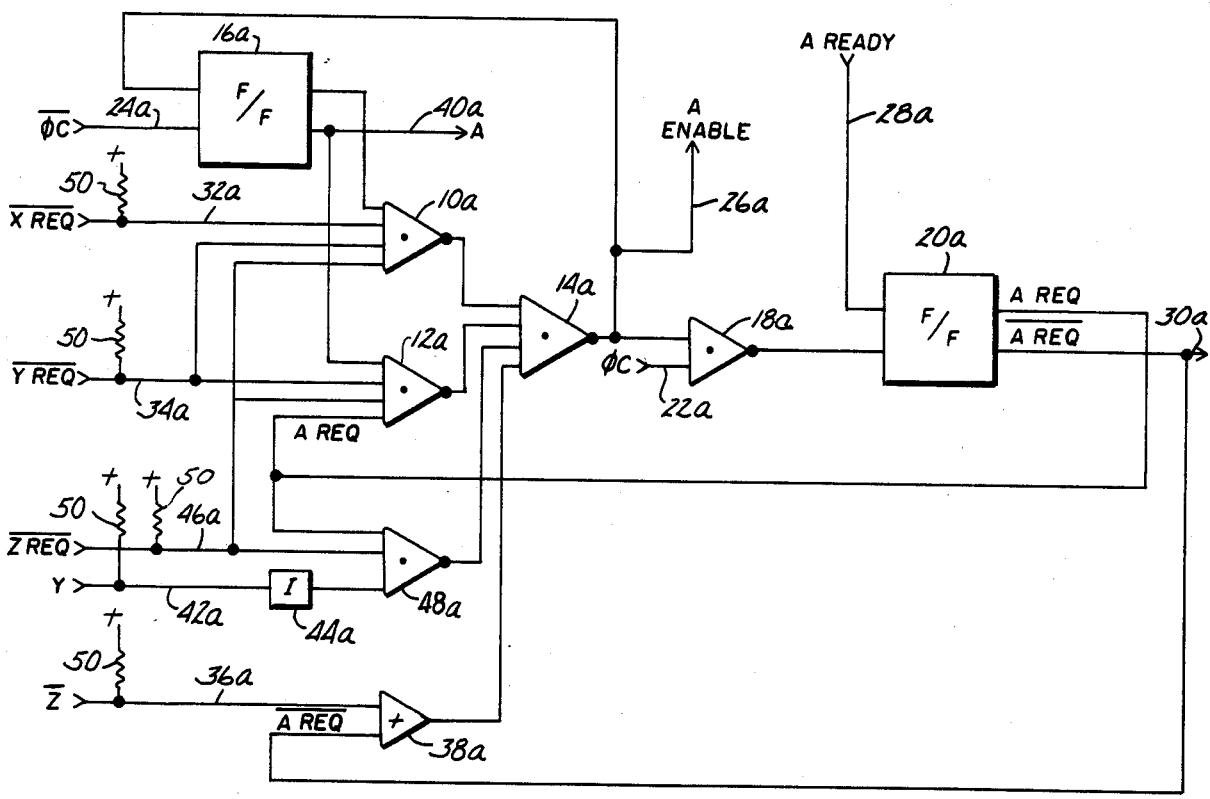

This invention will be more fully understood from the following detailed description and the accompanying drawings in which:

FIG. 1 is a block circuit diagram of a logic circuit in accordance with the presently preferred embodiment of the present invention for a system employing two stations;

FIG. 2 is a block circuit diagram of a logic circuit in accordance with the presently preferred embodiment of the present invention for a single station in a system employing three stations; and FIG. 3 is a block circuit diagram of a logic circuit in accordance with the presently preferred embodiment of the present invention for a single station in a system employing four stations With reference to the drawings, and particularly to FIG. 1, there is illustrated a block circuit diagram of the logic circuitry in accordance with the presently preferred embodiment of the present invention of a system employing two stations. For purposes of FIG. 1, one of the stations is designated Station A and the other is designated Station X. For the purposes of FIGS. 2 and 3, the station shown will be designated Station A and the stations forming the remainder of the system will be designated Stations X, Y and Z, respectively. Similar reference numerals will designate similar items in each Figure.

With reference to FIG. 1, and particularly to that much of the circuit diagram associated with Station A, there is illustrated a plurality of NAND gates 10a and 12a, each providing an output to an input of NAND gate 14a. NAND gate 14a provides an output to the data input of flip-flop 16a and to one input of NAND gate 18a. The second input 22a of NAND gate 18a is received from a clock (not shown) which supplies a source of clock signals designated ∅c. A second clock signal, 180° out of phase with the clock signal ∅c, is provided to the clock input 24a of flip-flop 16a and is designated not-∅c. The "true" output of flip-flop 16a is provided as one input to NAND gate 10a, and the "false" output of flip-flop 16a is provided as one input to NAND gate 12a. An A Enable signal is provided on lead 26a at the output of NAND gate 14a.

The output of NAND gate 18a is provided to the clock input of flip-flop 20a. The set input of flip-flop 20a is received from the station A as an A Ready signal on lead 28a, indicative that the station is ready to seize use of the channel. Flip-flop 20a provides an A Request signal output at its "true" output which is inputted to a second input of NAND gate 12a and provides a not-A Request signal at its "false" output on lead 30a which is inputted to an input 32x of NAND gate 10x in the logic circuitry associated with Station X.

The lower portion of FIG. 1, illustrates logic circuitry associated with Station X that is identical to that associated with Station A, except that the not-X Request signal output from the "false" output 30x of flip-flop 20x is connected as an input 32a to NAND gate 10a.

Flip-flop 16 operates to set its "true" or "false" outputs high or low depending on the condition of the signal at the data input when the leading edge of a positive pulse signal appears at the clock input. If the data input is high (the Enable signal is high), flip-flop 16 operates to set its "true" output high and its "false" output low in response to the leading edge of the next not-clock signal. If the data input is low (the Enable signal is low), flip-flop 16 operates to set its "false" output high and its "true" output low in response to the leading edge of the next not-clock cycle.

Flip-flop 20 operates to set its Request output high and its Not-Request output low in response to a high input signal at its set input on lead 28. Flip-flop 20 operates to set its Not-Request output high and its Request output low in response to the leading edge of a positive pulse signal from gate 18 when the set input on lead 28 is low.

With reference to FIG. 2, there is illustrated the logic circuit diagram of the logic circuitry for a single station of a three station system. The primary differences between the logic circuitry illustrated in FIG. 2 and that illustrated for a station in FIG. 1, is the inclusion of an input 34a to receive a not-Y Request signal from Station Y as a third input to each of NAND gates 10a and 12a, an output on line 40a of a not-A Using signal for use by other stations, and the inclusion of OR gate 38a having inputs from the not-A Request output of flip-flop 20a and from a not-Y Using signal on lead 36a from Station Y with its output connected to an input of NAND gate 14a.

FIG. 3 illustrates the block circuit diagram of the logic circuitry for single station of a four-station system and is essentially the same as that illustrated in FIG. 2, except that there is an additional NAND gate 48a providing an input to NAND gate 14a. The not-Y Using signal is connected through input 42a and invertor 44a as one input of NAND gate 40a; the not-Z Using signal is connected to the input at 36a to OR gate 38a; a not-Z Request signal is provided at input 46a an a second input to NAND gate 48a; and as a fourth input to each of NAND gates 10a and 12a, and the A request signal is provided as a third input to NAND gate 48a.

In operation of the apparatus according to this invention, a station is enabled to seize use of the channel whenever its respective NAND gate 14 provides a high output on lead 26. NAND gate 14 provides a high output whenever either of its inputs is low. An input to NAND gate 14 will be low whenever both inputs to the respective driving NAND gate 10 or 12 are high. Therefore, it will be evident that the A-enable signal provided by NAND gate 14a is high whenever flip-flop 16a provides a high signal at its "true" output and there is no request from Station X, or whenever flip-flop 16a provides a high signal at its "false" output and there is a request from Station A. The NAND gates operate to provide a high signal only when less than all input signals are high.

Broadly, a station will set its enable signal high whenever the station requests use of the channel and no station of higher priority has an unsatisfied request outstanding, or when the station already has use of the channel and no other station requests use. Stated another way, if a station has use of the channel and no other station requests use of the channel, the station having use keeps it; but if a station has use of the channel and another station requests use of the channel, the other station gets it. Flip-flop 16 records whether or not the respective station has use of the channel.

Turning first to FIG. 1, wherein two stations are contending for use of the channel, assume that Station X in the lower portion of FIG. 1 has use of the channel, and that Station A is requesting use of the channel. Prior to receipt of the A-Ready signal on lead 28a, the conditions of the logic circuitry were essentially as follows: the X-Enable signal is high, thereby setting flip-flop 16x to provide a low "false" output signal; the not-A Request signal on lead 32x is high, so that the conditions at NAND gate 10x are such as to produce a low output to one input of NAND gate 14x, so that NAND gate 14x provides a high output. Hence, the X-Enable signal on the 26x is high. When the A-Ready signal appears on lead 28a, flip-flop 20a sets the A-Request signal high and the not-A Request signal low. Presence of the high A-Request signal at the input of NAND gate 12a causes the output of NAND gate 12a to go low, the other input of NAND gate 12a already being high due to the high "false" output condition of flip-flop 16a. The low condition of the output of NAND gate 12a causes the output of NAND gate 14a to go high, thereby setting a high A-Enable signal on lead 26a. The high A-Enable signal at the data input of flip-flop 16a permits setting of the flip-flop to provide a high "true" output and a low "false" output upon the next not-clock signal on lead 24a. The low not-A Request signal on lead 32x causes NAND gate 10x to go high. Since flip-flop 16x was in a set condition the "false" output is low, so that NAND gate 12x also goes high and the conditions at NAND gate 14x are such as to drive its output low, thereby driving low the X-Enable signal on lead 26x and the data input of flip-flop 16x, permitting reset of flip-flop 16x upon the next not-clock signal on lead 24x.

A Ready signal to a flip-flop 20 will ordinarily appear as a pulse to set the flip-flop 20. If the respective station is not enabled, the flip-flop 20 will not be reset, even after termination of the Ready pulse signal, because the output from the respective gate 18 is held high due to the low Enable signal. When the station becomes enabled, the high output from gate 14 causes the output from gate 18 to go low when the clock signal goes high so that when the clock signal agains goes low, gate 18 will produce a high output, the leading edge of which causes flip-flop 20 to reset to a low Request output and a high Not-Request output if the Ready signal is low. If, however, the Ready signal is high (indicative that the station again is ready to seize use of the channel), the Request signal will be set high and the Not-Request signal will be set low.

It can be seen, therefore, that if both stations are ready to seize use of the channel, each station obtains use of the channel for alternate clock cycles. Since the demand driven access mechanism according to the present invention is designed for units having a relatively low band width, which cannot use every clock cycle anyway, the effect of the apparatus, according to the present invention, is to prevent contention during identical clock cycles and permit allocation of all units on successive clock cycles, thereby making more effective use of the communication channel.

In the case of a system employing three stations as illustrated in FIG. 2, it can again be understood that a station will seize use of the channel, in accordance with established priorities, whenever it requests use of the channel, and the station having use of the channel will give up use to any station seeking use of the channel. For example, assume that Station A has use of the channel and one or the other of Stations X and Y desire use of the channel, at least one of the not-X Request and not-Y Request signals will go low (due to either or both the X Request and Y Request signals going high) causing NAND gate 10a to produce a high output. It can be appreciated that NAND gate 12a is producing a high output (due to the low output from the "false" output of flip-flop 16a), and that OR gate 38a is providing a high output (due to the high output from not-Y Using), so that the high output from NAND gate 10a causes NAND gate 14a to produce a low output, thereby removing the A-Enable signal from lead 26a.

If Station A is not enabled to use the channel, but a request to use the channel comes from Station A, an A Request signal will be imposed on gate 12a and the not-A Request signal will be removed from gate 38a, as well as the applicable gates in the circuits for the other stations. If Station Y were the station last using the channel and is the station enabled, the conditions at OR gate 38a are such as to pass a low signal to the input of NAND gate 14a, thereby providing a high A-Enable signal on lead 26a, setting flip-flop 16a to produce a high "true" output. On the other hand, if Station X were using the channel, OR gate 38a will pass a high signal due to the high level of the not-Y Using input, and Station A will be enabled only if NAND gate 12a is set low due to a high input from the not-Y Request signal (indicative that Station Y does not seek use of the channel). On the other hand, if Station X was using the channel and both Station A and Station Y seek use of the channel, NAND gates 10a and 12a are both set high, thereby preventing NAND gate 14a from providing a high A-Enable output signal. Instead, priority will be allocated to Station Y. Hence, it can be understood that the priority ordering is such that Station A has priority over Station X, Station X has priority over Station Y, and Station Y has priority over Station A. A similar analysis can be made of the logic circuitry of FIG. 3, where four stations are involved, Station A having priority over Station X, Station X having priority over Station Y, Station Y having priority over Station Z, and Station Z having priority over Station A.

If a station has use of the channel and no other station seeks use of the channel, that station will retain use of the channel. For example, in FIG. 1 where only two stations are involved, if Station A has use of the channel and Station X does not seek use of the channel, the conditions are such as to maintain gate 14a in an operated condition and maintain gate 14x in an unoperated condition. Thus, the high "true" output from flip-flop 16a and the high not-X Request signal on lead 32a drive gate 10a low to set gate 14a high to provide a high A-Enable signal on lead 26a. Likewise, the low "true" output from flip-flop 16x to gate 10x and the low condition of the X-Request signal to gate 12x are such as to maintain both gates 10x and 12x in a high condition to drive gate 14x low, thereby maintaining a low X-Enable signal on lead 26x. Similarly, in respect to the circuits of FIGS. 2 and 3, gate 10a is maintained in a low operating condition due to the high inputs from the flip-flop 16a, the not-X Request and not-Y Request and not-X Request (FIG. 3) signals, to thereby maintain gate 14a operated to provide a high A-Enable signal on lead 26a.

Resistors 50 are provided at the inputs for each of the logic circuitries from the other stations so that if a station is removed from the system, it is not necessary to modify the circuitry of the other stations. Instead, when a station is removed from the system, the resistors will pull the NAND gate down so as not to give false indication of the presence of that station or false indication of a request or status from the station now removed from the system. For example, if Station Z were removed from the circuit illustrated in FIG. 3, a signal through resistor 50 would provide a steady high output from OR gate 38a, and will provide a high input to the respective input of gates 12a and 48a. Noteworthy is the fact that the not-Y Using input through invertor 44a to NAND gate 48a, together with the A-Request input also to the input of NAND gate 48a, is equivalent to the not-Y Using input and not-A Request input of OR gate 38a of FIG. 2. Thus, removal of Station Z from the system is, in effect, a reversion of the circuitry of that of FIG. 2.

One feature of the present invention resides in the fact that a greater number of stations than four may be employed, expanding the principles of the present invention. Also, identical are circuitries used for each station.

It will be appreciated that if two or more stations seek use of the channel, they will time-share the channel. For example, if there are four stations on the channel (FIG. 3) and stations A, X and Z all seek use of the channel, each will be allocated use of the channel during successive clock cycles: A, X, Z, A, X . . . etc. Station Y will not be allocated use of the channel since it does not seek use of the channel. Therefore, in this example, each requesting station has use of the channel every third clock cycle. This feature is particularly advantageous where the units operate at a lower bandwidth or rate than the communication channel. For example, if units using the channel are capable of operating at rates of one-fourth that of the communication rate, up to four units may time-share the channel in the manner described without impacting the operation rate of any unit.

Another feature of the present invention resides in the fact that upon the generation of a request signal by a station, the station may be immediately enabled without regard to the condition of the clock signal. However, the station Using and station Request signals are time dependent on the clock signals to avoid conflict between the stations so that the several stations may time-share the channel.

The present invention thus provides a reliable demand driven access mechanism highly suitable for use with units having relatively low band widths. The system provides allocation to those units wishing to seize use of the channel and alternates allocation between them on each clock cycle. Thus, if two or more stations request use of the channel, each seeking station is given access to the channel during subsequent clock cycles.

This invention is not to be limited by the embodiment shown in the drawings and described in the description, which are given by way of example and not of limitation, but only in accordance with the scope of the appended claims.

What is claimed is:

1. In a communication system having a plurality of stations each capable of seizing use of a communications channel shared by said stations, the improvement comprising, at each station, a demand driven access mechanism for enabling the respective station to seize use of the channel, said mechanism comprising:
A. first logic means responsive to the respective station for producing a station request signal whenever the respective station is ready to seize use of the channel, and for producing a station not-request signal whenever the respective station is not ready to seize use of the channel;
B. second logic means for producing an enable signal, said second logic means comprising:
   (i) storage means having a true output and a false output, and
   (ii) gate means having an output and having inputs connected to the true and false outputs of said storage means, the respective station's request signal and the other stations' not-request signals to produce said enable signal at its output whenever said gate means receives said true output from said storage means and the other stations' not-request signals or receives said false output from said storage means and the station's request signal, said storage means having a data input connected to the output of said gate means and having a clock input connected to a source of clock signals;
C. output means for providing said enable signal to the respective station.

2. Apparatus according to claim 1 wherein said second logic means further produces a not-using signal at the false output of the respective station's storage means, said gate means being further responsive to the absence of the respective station's not-request signal and to the absence of selected other stations' not-using signals to produce said enable signal.

3. Apparatus according to claim 1 wherein said gate means comprises a first NAND gate having inputs connected to receive the true output of said storage means and the other stations' not-request signals, a second NAND gate having inputs connected to receive the false output of said storage means, and the respective station's request signal, and a third NAND gate connected to receive the outputs of said first and second NAND gates to produce said enable signal.

4. Apparatus according to claim 3 wherein said second logic means further produces a not-using signal at the false output of the respective station's storage means, said gate means further including an OR gate connected to receive the respective station's not-request signal and a selected other station's not-using signal, said third NAND gate being connected to receive the output of said OR gate.

5. Apparatus according to claim 4 wherein said gate means further includes a fourth NAND gate connected to receive said first-named selected other station's not-request signal, an inverted not-using signal from a second selected other station, and the respective station's request signal, said thrid NAND gate being connected to receive the output of said fourth NAND gate.

6. A demand driven access mechanism for enabling a first station to seize use of a communication channel shared with one or more second stations in a time-sharing mode, said mechanism comprising: first logic means responsive to a signal from said first station for producing a station request signal indicative of whether or not said first station is ready to seize use of the channel; second logic means responsive to station request signals produced by all of said first and second stations for establishing a priority ordering of said first station in respect to all of said second stations which are ready to seize use of the channel, said second logic means being responsive to a clock signal and to said priority ordering for producing an enable signal to enable said first station to seize use of the channel when said first station has highest priority, said second logic means being responsive to said enable signal to adjust said priority ordering so that said first station thereupon has lowest priority.

7. Apparatus according to claim 6 wherein each of said second stations includes storage means for producing a signal representative of whether the respective second station is using the channel, said second logic means being further responsive to the signal from the storage means of at least some of said second stations to establish said priority ordering.

8. Apparatus according to claim 6 wherein said second logic means includes first storage means having mutually distinct true and false states, said first storage means being responsive to said first station's enable signal to assume said true or false state depending on the condition of said first station's enable signal, said second logic means being responsive to the true state of said first storage means to set the priority ordering of said first station at lowest priority.

9. Apparatus according to claim 8 wherein each of said second stations includes second storage means having mutually distinct true and false states representative of the status of the respective second station's present use of the channel, said seond logic means being further responsive to the state of said second means of at least some of said second stations to establish said priority ordering.

* * * * *